(12) United States Patent
Sindel (10) Patent No.: US 6,770,121 B1
(45) Date of Patent: Aug. 3, 2004

(54) SEPARATOR WITH REGIONS OF DIFFERING SURFACE TENSIONS

(75) Inventor: Allen W. Sindel, Whitehouse, TX (US)

(73) Assignee: Harbison-Fischer, Inc., Crowley, TX (US)

( * ) Notice: Subject to any disclaimer, the term of this patent is extended or adjusted under 35 U.S.C. 154(b) by 0 days.

(21) Appl. No.: 10/242,117

(22) Filed: Sep. 12, 2002

(51) Int. Cl.[7] .............................................. B01D 45/08
(52) U.S. Cl. ............................ 95/267; 55/435; 55/440; 96/190
(58) Field of Search .................... 55/435, 440; 96/188, 96/189, 190; 95/267

(56) References Cited

U.S. PATENT DOCUMENTS

| | | | |
|---|---|---|---|
| 3,338,035 A | * | 8/1967 | Dinkelacker ................. 55/440 |
| 3,813,855 A | | 6/1974 | Hill et al. |
| 3,849,095 A | | 11/1974 | Regehr |
| 3,870,488 A | | 3/1975 | Arndt et al. |
| 3,953,183 A | | 4/1976 | Regehr |
| 4,430,101 A | | 2/1984 | Sixsmith |
| 4,443,233 A | | 4/1984 | Moran |
| 4,543,108 A | | 9/1985 | Wurz |
| 4,557,740 A | | 12/1985 | Smith |
| 4,581,051 A | * | 4/1986 | Regehr et al. ................ 55/440 |
| 5,112,375 A | | 5/1992 | Brown |

* cited by examiner

Primary Examiner—Robert A. Hopkins
(74) Attorney, Agent, or Firm—Geoffrey A. Mantooth (57) ABSTRACT

The separator has a vane assembly made up of a number of corrugated vanes that are oriented with respect to each other so as to provide serpentine paths for the gas stream therethrough. As the gas stream flows through the serpentine paths, it changes direction and liquid in the gas stream impacts the surfaces of the vanes. The upstream section of the vane assembly has roughened surfaces to decrease the surface tension of the liquid, thereby causing the liquid to coalesce. The downstream section of the vane assembly has smooth surfaces so as to increase the surface tension of the liquid. Thus, the coalesced liquid flows from the roughened surfaces to the smooth surfaces where the liquid forms beads and drains by gravity.

19 Claims, 7 Drawing Sheets

SEPARATOR WITH REGIONS OF DIFFERING SURFACE TENSIONS

FIELD OF THE INVENTION

The present invention relates to apparatuses and methods for separating liquid from gas.

BACKGROUND OF THE INVENTION

Separators for separating liquid from gas are well known in the art. Separators are used, for example, to dry natural gas. The gas has liquid, such as water, entrained therein. If the natural gas is transported through pipelines in a "wet" condition, the water acts to Corrode the steel pipelines, causing possible ruptures and explosions. Thus, it is desirable to economically and effectively remove the water from natural gas, and in general, to remove various types of liquids from various types of gasses.

One prior art type of separator is taught by Hill et al., U.S. Pat. No. 3,813,855. The Hill patent teaches shaped vanes for channeling a fluid flow in a serpentine path. This path creates impact regions and sheltered regions, wherein the liquid in the fluid flow impacts the vanes and collects in the sheltered regions. Another prior art shaped separator is shown in Brown, U.S. Pat. No. 5,112,375.

The serpentine path separators typically require additional means to aid in the separation process. For example, in Regeher, U.S. Pat. No. 3,953,183, serrations are used on the vane surfaces for capturing and draining coalesced liquid. These type of separators are expensive to manufacture.

Another prior art technique uses serpentine path separators in conjunction with a fine wire mesh located at the inlet end of the vanes. The wire mesh increases the effectiveness of the separation; the fluid passes through the wire mesh before entering the vane channels and liquid coalesces on the wire mesh, dropping to the bottom of a tank containing the separator vanes.

The problem with using a wire mesh is that the mesh tends to become clogged with particulates and solids in the fluid stream. When the mesh becomes clogged or partially blocked, the overall efficiency in the separator becomes reduced.

SUMMARY OF THE INVENTION

It is an object of the present invention to provide a separator for separating liquid from gas in a fluid flow.

It is another object of the present invention to provide a separator with an increased efficiency and a smaller physical size.

The present invention provides a vane assembly for use in a separator for separating liquid from gas. The vane assembly comprises vanes spaced apart from and adjacent to one another and forming a serpentine path between any two adjacent vanes. The vanes have surfaces along the paths. The vanes have an inlet section and a downstream section. The inlet section of the vanes have vane surfaces with a first surface area per unit area. The downstream section has vane surfaces with a second surface area per unit area. The second surface area is smaller than the first surface area so that the vane surfaces of the inlet section are more wettable than the vane surfaces of the downstream section.

In accordance with one aspect of the present invention, the vane surfaces of the inlet section are roughened and the vane surfaces of the downstream section are smooth.

The present invention also provides an assembly for use in the separator for separating liquid from gas comprising corrugated plates with ridges and grooves. The plates are spaced apart from one another so as to form paths between the adjacent plates. The plates are oriented so that the ridges of any one plate are aligned with the ridges of an adjacent plate and the grooves of one any one plate are aligned with the grooves of an adjacent plate. The vane assembly has an upstream section and a downstream section. The upstream section of the plates has roughened plate surfaces while the downstream section of the plates has smooth plate surfaces.

In accordance with one aspect of the present invention, the roughened plate surfaces are blasted with a blasting media.

In accordance with another aspect of the present invention, the roughened plate surfaces have a roughness profile of 2–6 mils anchor pattern.

In accordance with another aspect of the present invention, the smooth plate surfaces are rolled smooth.

The present invention also provides a separator for separating liquid from gas comprising a vessel and a vane assembly located inside of the vessel. The vane assembly has vanes spaced apart from and adjacent to one another and forming a serpentine path between any two adjacent vanes. The vanes have surfaces along the paths. The vessel has inlet and outlet ports. The inlet port is aligned with an inlet section of the vane assembly. The inlet section of the vane assembly has roughened plate surfaces. The outlet port is aligned with an outlet section of the vane assembly, which outlet section has smooth plate surfaces.

In accordance with one aspect of the present invention, the roughened plate surfaces are blasted with a blasting media.

In accordance with another aspect of the present invention, the roughened plate surfaces have a roughness profile of 2–6 mils anchor pattern.

In accordance with still another aspect of the present invention, a separator for separating liquid from gas comprises a vessel and a vane assembly located inside of the vessel. The vane assembly has corrugated plates with ridges and grooves, with the plates being spaced apart from one another so as to form paths between adjacent plates. The plates are oriented so that the ridges of any one plate are aligned with the ridges of an adjacent plate and the grooves of any one plate are aligned with the grooves of an adjacent plate. The vessel has inlet and outlet ports. The inlet port is aligned with an inlet section of the vane assembly. The inlet section of the vane assembly has vane surfaces with a first surface area per unit area. The outlet port is aligned with an outlet section of the vane assembly, which outlet section has vane surfaces with a second surface area per unit area. The second surface area is smaller than the first surface area so that the vane surfaces of the inlet section are more wettable than the vane surfaces of the outlet section.

In accordance with one aspect of the present invention, the vane surfaces of the inlet section are roughened and the vane surfaces of the outlet section are smooth.

The present invention also provides a method of making a vane assembly. Corrugated plates are provided with each of the corrugated plates having ridges and grooves. A portion of the plates is blasted so as to create roughened surfaces while leaving another portion of the plates unblasted. The plates are aligned so as to be spaced apart from one another, with the ridges of any one plate aligned with the ridges of the other plates. The plates are oriented so that the roughened surfaces are located at an upstream end and the unblasted portions of the plates are located at a downstream end.

In accordance with one aspect of the present invention, the step of aligning the plates further comprises the step of generally aligning the plates in a parallel arrangement.

In accordance with another aspect of the present invention, the step of aligning the plates further comprises generally aligning the plates in a radial arrangement with the roughened surfaces near a center of the vane assembly than are the unblasted portions.

In accordance with still another aspect of the present invention, the step of blasting a portion of the plates further comprises blasting a first group of plates and leaving a second group of plates unblasted. The step of orienting the plates further comprises orienting the first group of plates in an end-to-end manner with the second group of plates.

The present invention also provides a method of separating liquid from a gas stream. The gas stream is flowed through a path and the gas stream is caused to change direction so as to impact the liquid on the sides of the path. The surface tension of the liquid on the sides of the path is reduced so as to cause coalescing of the liquid. Then, the surface tension of the liquid on the sides of the path is increased so as to allow the liquid to drain off of the sides.

In accordance with an aspect of the present invention, the surface tension of the liquid is reduced on the sides of the path by flowing the liquid over a roughened surface. The surface tension of the liquid on the side of the path is increased by flowing the liquid over a smooth surface.

DESCRIPTION OF THE PREFERRED EMBODIMENTS

Figure 1:
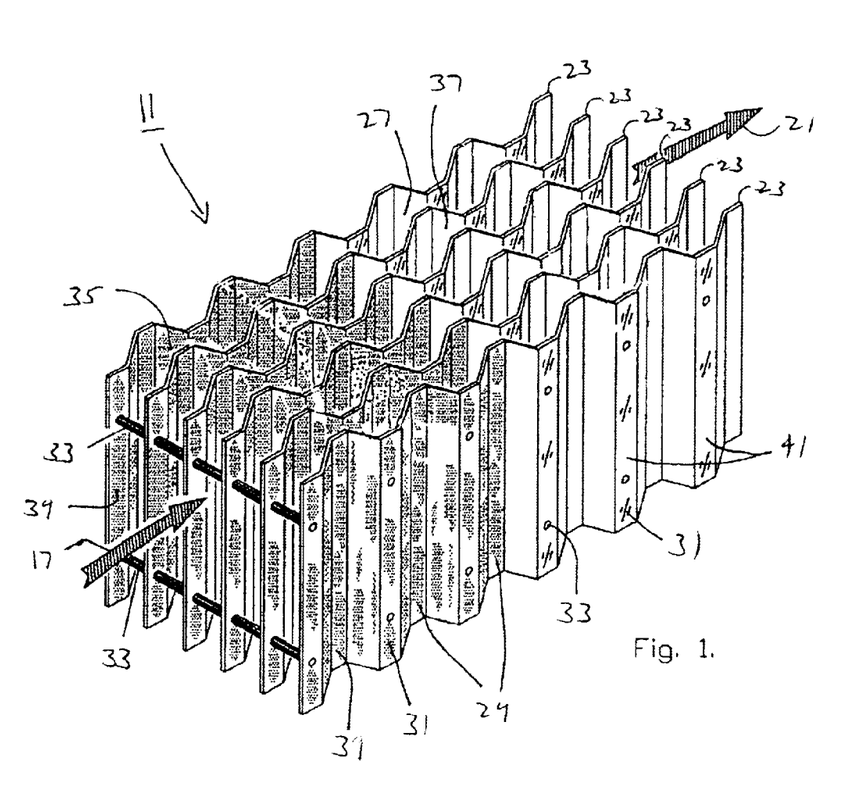
FIG. 1 is an isometric view of an array of vanes of the separator of the present invention, in accordance with a preferred embodiment.
Figure 4:
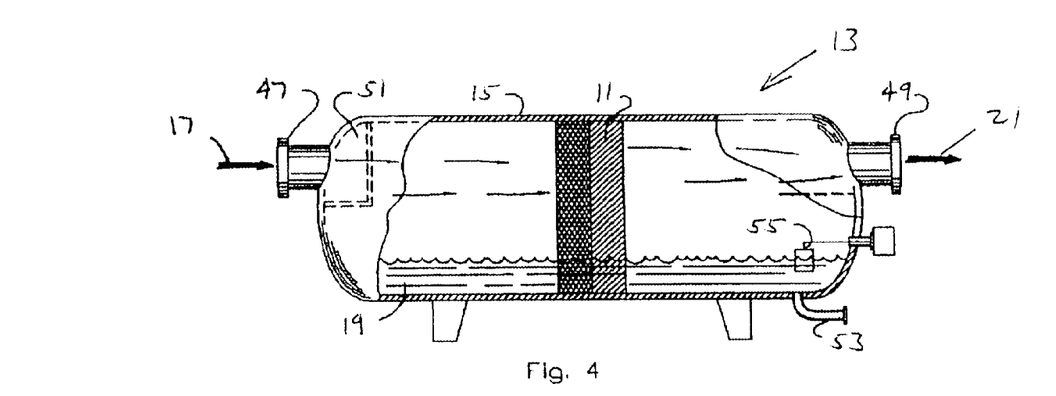
FIG. 4 is an elevational cross-sectional view of a separator vessel that utilizes the vane array of FIGS. 1 or 2.

In FIG. 1, there is shown the vane assembly 11 in accordance with one embodiment. The vane assembly 11 is one component of a separator 13, such as is shown in FIG. 4. The vane assembly 11 is contained within a vessel 15 and fluid 17 is passed through the vane assembly. The fluid 17 contains gas and entrained liquid. The liquid 19 coalesces in the vane assembly 11, failing or draining down into the bottom of the separator vessel 15, while the gas 21 exits.

The vane assembly has a number of vanes 23 (see FIG. 1). With the vane assembly 11 of FIG. 1, the vanes 23 are generally parallel to one another. With the vane assembly 25 of FIG. 3, the vanes 23 extend in generally radial directions from a center.

The vane assemblies 11, 25 provide serpentine paths 27 (see FIGS. 1–3) for the fluid to travel through. Such serpentine paths entice the liquid to separate from the gas. Serpentine type assemblies are shown in U.S. Pat. Nos. 3,813,855 and 5,112,375, the complete disclosures of which are incorporated herein by reference. The vane assemblies of the present invention are designed to further enhance the coalescing of liquid, while providing for optimum flow rates.

The vane assembly 11 shown in FIG. 1 has plural vanes 23. The assembly 11 can of course have more or less vanes than what are shown in the FIGS. Each vane 23, or plate, is corrugated, wherein as shown with reference to the orientation of FIG. 2, each vane has parallel and alternating ridges 29 and grooves 31. The vanes 23 are located adjacent to each other so that the ridges 29 of any particular vane are aligned with the ridges of adjacent vanes. Likewise, the grooves 31 of any particular vane are aligned with the grooves of the adjacent vanes. The vanes are spaced apart from each other so as to create a sinuous path 27 between two adjacent vanes (see FIG. 2). The vanes are coupled together with connecting rods 33 (FIG. 1) that are spaced throughout the vane assembly. (FIG. 2 does not show any connecting rods to better illustrate the flow of fluid therethrough.)

When assembled, the vane assembly 11 has an inlet end section 35 and an outlet end section 37. (In FIGS. 1–3, the inlet end section 35 is shown by stippling.) The inlet end section 35 has roughened surfaces 29 on both sides of each vane, while the outlet end section 37 has smooth surfaces 41 on both sides of each vane.

The vanes 23 can be made of a variety of materials such as stainless steel, carbon steel or plastic, depending on the fluid that is to flow through the separator. Certain fluid streams contain or form acids. For example, if a fluid stream contains sulfuric acid, then stainless steel is preferred for the vanes. If the fluid contains carbon dioxide and carbolic acid may form, then a plastic such as polypropylene is preferred.

The steel corrugated vanes typically have smooth surfaces 41 resulting from fabrication, which includes a cold rolling step. Cold rolling provides a smoother surface than does hot rolling.

The inlet end section 35 of the vanes are roughened in order to aid in the coalescing of liquid droplets. Roughening occurs, in the preferred embodiment, by subjecting the vane to a flow or blast of blasting media (such as sand or grit). The portion of the vane that is to remain smooth is masked off from the blasting media. Both sides of the vane in the inlet end section 35 are subjected to the blasting media to achieve the roughened surface 39 on each vane side. In the preferred embodiment, the inlet end section is blasted to achieve roughened surfaces 39 with a roughness profile of 2–6 mils anchor pattern. The anchor pattern is defined by the Structure Steel Painting Council (SSPC). Other roughness measurements or criteria can be used. Plastic vanes can be molded with roughened surfaces or the roughened surfaces can be made by blasting.

The treated vanes 23 are then aligned with respect to each other, so that the ridges 29 of a vane are aligned with the ridges of the other vanes and the grooves likewise aligned. Also, the vanes are oriented so that the roughened surfaces 39 are all located together at the same end. The vanes are then connected together by connecting rods 33.

Figure 2:
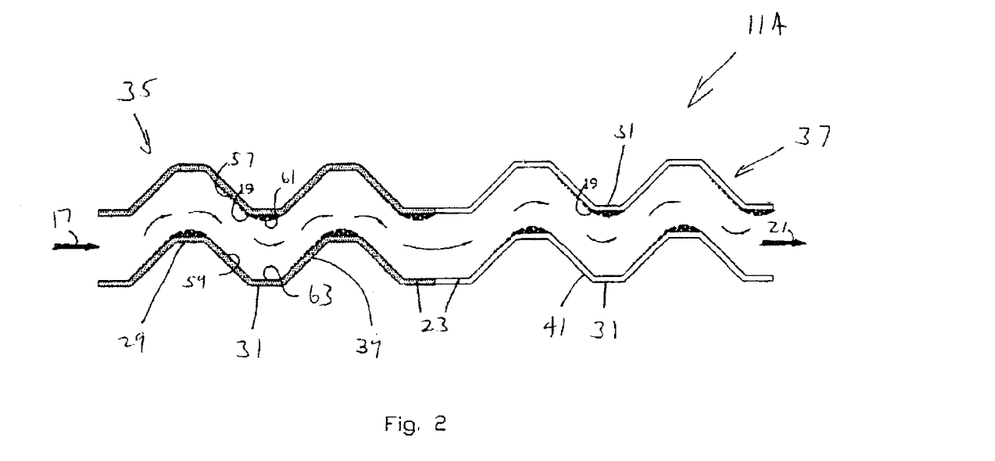
FIG. 2 is a plan view of two of the separator vanes, in accordance with another embodiment.
Figure 2A:
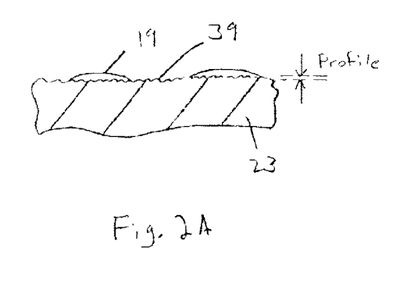
FIG. 2A is a cross-sectional view of a portion of a vane, showing the roughened surface.
Figure 2B:
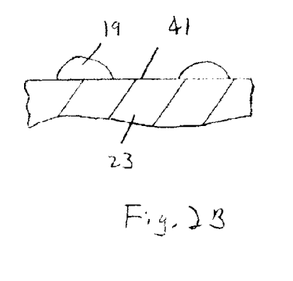
FIG. 2B is a cross-sectional view of a portion of a vane, showing the smooth surface.

Alternatively, a vane assembly 11A can be made by utilizing two independent sections to make a single vane assembly. Referring to FIG. 2, the sections 35, 37 are manufactured independently of each other. The inlet end section 35 has vanes with roughened surfaces 39 while the outlet end section 37 has vanes with smooth surfaces 41. The sections 35, 37 are located end-to-end such that the downstream edges of the inlet end section 35 vanes abut the upstream edges of the outlet end section 37 vanes. The edges of the vanes need not be perfectly aligned; some misalignment can be tolerated. The vane assembly 11A can be used in lieu of the vane assembly 11.

The vanes are constructed into an assembly and adapted to a variety of horizontal, vertical or center centrifugal designs. The vanes need not be perfectly vertical and can in fact be angled at up to thirty degrees from the vertical. When so angled, the vanes will lean and will effectively increase the surface area of the overall vane assembly for a given height.

FIGS. 4–7 illustrate separators having the vane assembly 1 placed into a vessel. The vessel has an inlet 47 and an outlet 49. The inlet end section 35 of the vane assembly 11 is located nearest the inlet 47, while the outlet 11 end section 37 is located nearest the outlet 49. Thus the fluid 17 flows from the inlet 47 into the inlet end section 35, and from the outlet end section 37 to the outlet 49.

FIG. 4 shows a separator with a horizontal vessel 15. Downstream of the inlet 47 and inside of the vessel is an initial impact surface or diverter 51. Droplets contained in the incoming fluid stream will impact the diverter 51 and fall to the bottom of the vessel, pooling at some level. An outlet pipe 53 is provided for draining the liquid from the vessel. The outlet pipe is controlled by a float valve 55. Thus, when the level of the liquid 19 becomes high, the float valve 55 opens and liquid drains out through the outlet pipe 53.

The fluid passes through the vane assembly 11 and the gas 21 exits the vessel through the outlet 49.

Referring to FIG. 2, the fluid flows between the individual vanes 23 of the vane assembly 11, following the serpentine path 27 bounded by the vanes. The cross-sectional areas between the vane surfaces 57, 59 are smaller than the cross-sectional areas between the vane surfaces 61 and 63. Thus, when the fluid flows from the areas of the path 27 between surfaces 57 and 59, to the areas between surfaces 61 and 63, the pressure drops. In addition, the direction of fluid flow changes, changing the velocity of the fluid and creating eddies in the fluid flow along surface 61. Liquid 19 in the fluid stream impacts on the surface 59 and flows onto surfaces 63, where the eddies are located. The fluid flowing in the paths 27 exhibits elements of laminar flow (Poiseuille flow) and turbulent flow.

The roughened surfaces 39 of the inlet end section 35 are wetting surfaces that reduce the surface tension of the liquid. Thus, the liquid that impacts the surfaces 57, 61 in the inlet end section 35 planes or spreads on the surface 39 (see FIG. 2A), rather than forming beads. This spreading of the liquid causes the individual portions of the liquid to coalesce into larger portions. The roughened surfaces have a high surface area, relative to the smooth surfaces. For a given unit area, the surface area of the roughened surfaces 39 is higher than the surface area of the smooth surfaces 41. For example, for a square centimeter segment of a smooth surface, the surface area of the segment will be one square centimeter. However, for a square centimeter segment of a roughened surface, the surface area of the segment will be greater than one square centimeter due to the peaks and valleys.

The roughness profile of the roughened surfaces 49 is typically expressed in mils of depth between the peaks and valleys. The profile should be deep enough to wet the liquid, allowing the liquid to form a film. The profile preferably is not so deep as to impede the migration of the liquid to the outlet end section 37.

The liquid moves along the roughened surfaces 39 flowing along the ridges 29 and grooves 31, pushed by the fluid flow. Wetting the liquid, before large scale coalescing forms large masses of liquid, minimizes the possibility of the liquid reentering the fluid stream. When the liquid enters the outlet end section 37 of the vine assembly, it contacts the nonwetting surface, or smooth surface 41, of the vanes. Consequently, the surface tension of the liquid increases. The liquid forms relatively large drops (see FIG. 2B) on the surface, with a weakened adherence to the vane. The liquid drops are large enough so that they are drawn down the vanes by gravity. The force of the fluid flow blowing on the drops may enhance the drops leaving the vanes. The drops fall to the bottom of the vessel.

Thus, the vane assembly is able to precipitate out of the fluid stream small fluid particles, coalesce those particles into bigger drops using a wettable surface, transport those larger drops to a nonwetting surface where they bead up due to increased surface tension and allow those drops to drain by gravity.

Figure 5:
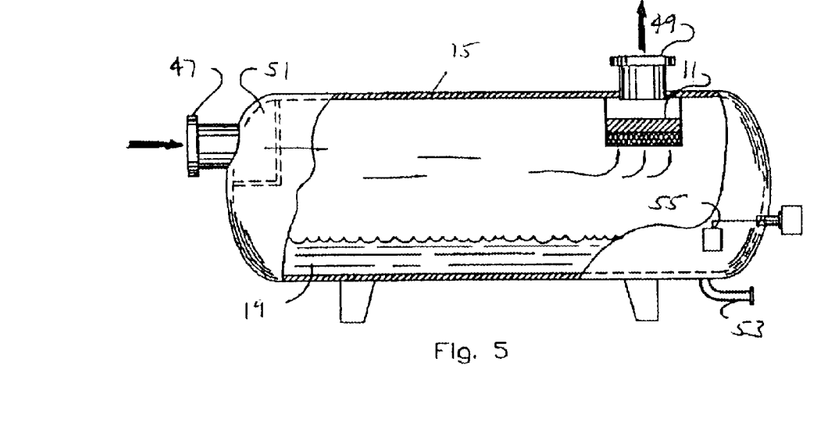
FIG. 5 is an elevational cross-sectional view of a separator vessel, in accordance with another embodiment, that utilizes the vane array of FIGS. 1 or 2.

FIG. 5 shows a separator with a horizontal vessel 15 that is substantially the same as the separator of FIG. 4. The outlet is vertical in FIG. 5, instead of horizontal, as shown in FIG. 4. The vane assembly 11 is located below the outlet 49, with the roughened inlet end section 35 below the smooth outlet section 37. Flow through the vane assembly is vertical, whereas in FIG. 4, flow through the vane assembly is horizontal.

Figure 6:
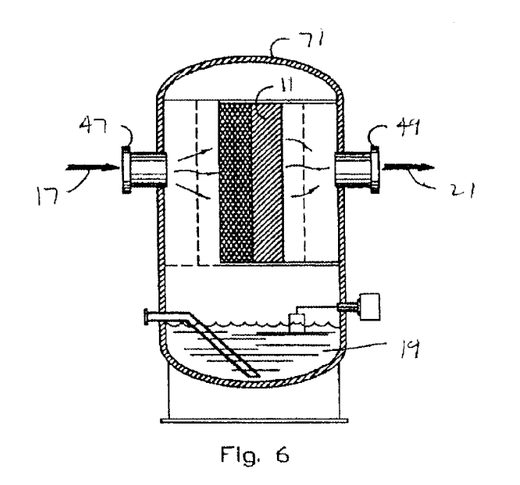
FIG. 6 is an elevational cross-sectional view of a separator vessel, in accordance with another embodiment, that utilizes the vane array of FIGS. 1 or 2.

In FIG. 6, the separator has a vertical vessel 71, with the inlet and outlet 47, 49 on the sides. The vane assembly 11 is located inside of the vessel. Distributor structure can be used to direct flow to and away from the vane assembly.

Figure 7:
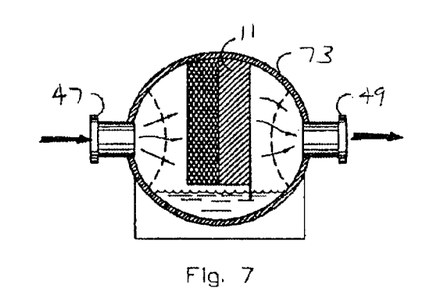
FIG. 7 is an elevational cross-sectional view of a separator vessel, in accordance with another embodiment, that utilizes the plate array of FIGS. 1 or 2.

FIG. 7 shows a horizontal vessel 73 similar to that shown in FIGS. 4 and 5. The inlet and outlet 47, 49 are located at the sides, instead of at the ends, as in FIG. 4. The vane assembly 11 is located between the inlet and outlet with distributor structure.

Figure 3:
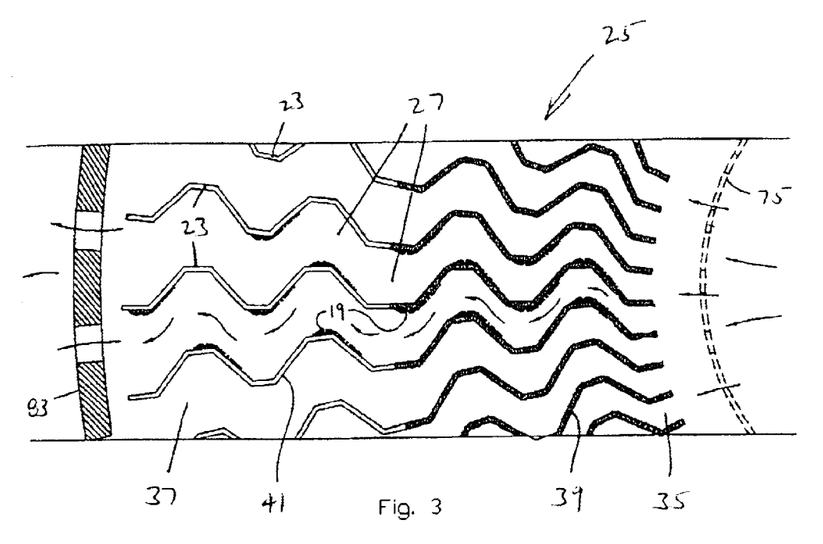
FIG. 3 is a plan view of a portion of a portion of radial array of separator vanes, in accordance with another embodiment, taken through lines III—III of FIG. 8.

FIG. 3 illustrates a radial type of vane assembly 25. Fluid enters the vane assembly from the center. Therefore, the inlet end section has roughened surfaces 39, while the outlet end section has smooth surfaces 41. The individual vanes 23, instead of being generally parallel to one another, are radial extensions from the center. Connecting rings 77 (see FIG. 10) connect the vanes 23 together. Distributor structure 75 is shown. The operation of the vane assembly 25 is substantially the same as the vane assemblies 11 and 11A.

Figure 8:
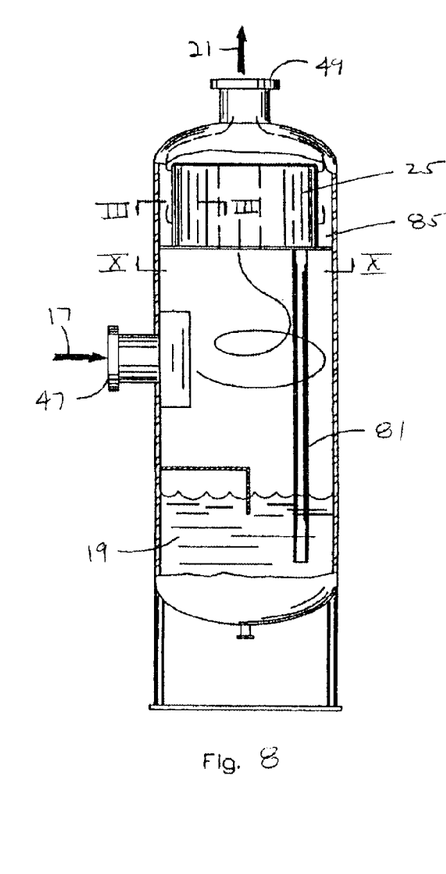
FIG. 8 is an elevational cross-sectional view of a separator vessel, in accordance with still another embodiment, that utilizes the vane array of FIG. 3.
Figure 9:
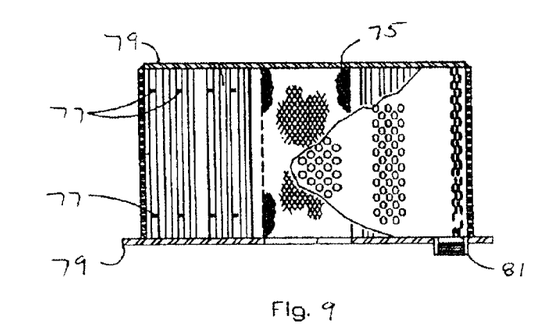
FIG. 9 is an elevational cross-sectional view of the vane array used in FIG. 8.
Figure 10:
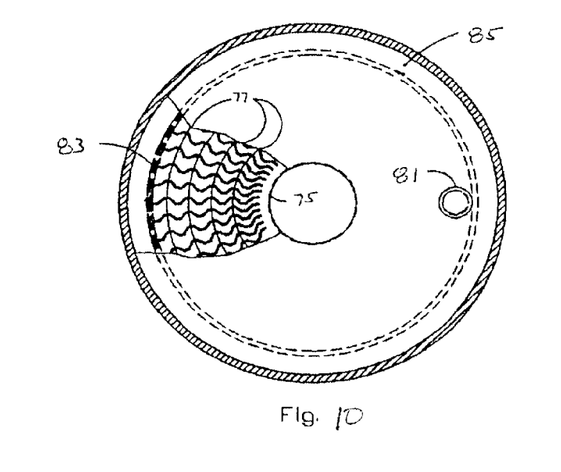
FIG. 10 is a bottom plan, or partial cross-sectional view of the vane array, taken through lines X—X of FIG. 8.

FIGS. 8–10 show a separator using the vane assembly 25. The vessel is vertical with the inlet 47 on a side and the outlet 49 on the upper end. Fluid 17 enters the vessel through the inlet 47 and flows up into the center of the vane assembly 25. The fluid then flows through a distributor 75 (FIGS. 9 and 10) and radially outward between the vanes 23. The top and bottom of the vane assembly 25 are closed by plates 79. The liquid falls to the bottom plate and exits via a drain pipe 81 to the bottom of the vessel. The gas exits the vane assembly through a perforated cylinder 83 around the vanes and enters an annular region 85 where it then flows to the outlet 49.

With the separator of the present invention, wire mesh need not be utilized upstream of the inlet end of the vanes. Consequently, there is less likelihood of clogging or blocking, and fluid flow is unimpeded through the separator. Any particles can be captured by a filter elsewhere in the fluid stream, in an easier-to-clean location.

Separators are sized according to K factors, which represent efficiency. The separator of the present invention has a higher K factor than do prior art separators. Separators of the present invention can be made physically smaller, thereby reducing manufacturing costs. The manufacturing of the vanes is inexpensive, requiring blasting and not any shaping of the vanes.

Furthermore, the separators maintain efficiency, even in the presence of foamable liquids. In prior art separators, foaming of the liquid reduces the separator efficiency as the surface area of the vanes becomes reduced. The roughened surfaces however, reduce the tendency of liquids to foam. Thus, the separator serves as a defoamer.

The foregoing disclosure and showings made in the drawings are merely illustrative of the principles of this invention and are not to be interpreted in a limiting sense.

What is claimed is:

1. An assembly for use in a separator for separating liquid from gas, comprising:
   a) vanes spaced apart from and adjacent to one another and forming a serpentine path between any two adjacent vanes, the vanes having surfaces along the paths;
   b) an inlet section of the vanes, the inlet section of the vanes having vane surfaces with a first surface area per unit area;
   c) an outlet section of the vanes located downstream of the inlet section, the outlet section having vane surfaces with a second surface area per unit area, the second surface area being smaller than the first surface area so that the vane surfaces of the inlet section are more wettable than the vane surfaces of the outlet section.

2. The assembly of claim 1, wherein the vane surfaces of the inlet section are roughened and the vane surfaces of the outlet section are smooth.

3. An assembly for use in a separator for separating liquid from gas, comprising:
   a) corrugated plates with ridges and grooves, the plates being spaced apart from one another so as to form paths between adjacent plates, the plates being oriented so that the ridges of any one plate are aligned with the ridges of an adjacent plate and the grooves of any one plate are aligned with the grooves of an adjacent plate;
   b) an upstream section of the plates having roughened plate surfaces, the roughened plate surfaces being located in at least one ridge and groove;
   c) a downstream section of the plates having smooth plate surfaces.

4. The assembly of claim 3 wherein the roughened plate surfaces are blasted with a blasting media.

5. The assembly of claim 3 wherein the smooth plate surfaces are rolled smooth.

6. An assembly for use in a separator for separating liquid from gas, comprising:
   a) corrugated plates with ridges and grooves, the plates being spaced apart from one another so as to form paths between adjacent plates, the plates being oriented so that the ridges of any one plate are aligned with the ridges of an adjacent plate and the grooves of any one plate are aligned with the grooves of an adjacent plate;
   b) an upstream section of the plates having roughened plate surfaces;
   c) a downstream section of the plates having smooth plate surfaces;
   d) the roughened plate surfaces have a roughness profile of 2–6 mils anchor pattern.

7. A separator for separating liquid from gas, comprising:
   a) a vessel;
   b) a vane assembly located inside of the vessel and having vanes, the vanes spaced apart from and adjacent to one another and forming a serpentine path between any two adjacent vanes, with the vanes having surfaces along the paths;
   c) an inlet port in the vessel, the inlet port being aligned with an inlet section of the vane assembly, the inlet section of the vane assembly having roughened plate surfaces;
   d) an outlet port in the vessel, the outlet port being aligned with an outlet section of the vane assembly, the outlet section of the vane assembly having smooth plate surfaces, the roughened plate surfaces of the inlet section being more wettable than the smooth plate surfaces of the outlet section.

8. The separator of claim 7 wherein the roughened plate surfaces are blasted with a blasting media.

9. A separator for separating liquid from gas, comprising:
   a) a vessel;
   b) a vane assembly located inside of the vessel and having vanes, the vanes spaced apart from and adjacent to one another and forming a serpentine path between any two adjacent vanes, with the vanes having surfaces along the paths,
   c) an inlet port in the vessel, the inlet port being aligned with an inlet section of the vane assembly the inlet section of the vane assembly having roughened plate surfaces;
   d) an outlet port in the vessel, the outlet port being aligned with an outlet section of the vane assembly, the outlet section of the vane assembly having smooth plate surfaces;
   the roughened plate surfaces have a roughness profile of 2–6 mils anchor pattern.

10. A separator for separating liquid from gas, comprising:
    a) a vessel;
    b) a vane assembly located inside of the vessel and having corrugated plates with ridges and grooves, with the plates being spaced apart from one another so as to form paths between adjacent plates, the plates being oriented so that the ridges of any one plate are aligned with the ridges of an adjacent plate and the grooves of any one plate are aligned with the grooves of an adjacent plate;
    c) an inlet port in the vessel, the inlet port being aligned with an inlet section of the vane assembly, the inlet section of the vane assembly having vane surfaces with a first surface area per unit area;
    d) an outlet port in the vessel, the outlet port being aligned with an outlet section of the vane assembly, the outlet section having vane surfaces with a second surface area per unit area, the second surface area being smaller than the first surface area so that the vane surfaces of the inlet section are more wettable than the vane surfaces of the outlet section.

11. The separator of claim 10 wherein the vane surfaces of the inlet section are roughened and the vane surfaces of the outlet section are smooth.

12. A method of making a vane assembly, comprising the steps of:
   a) providing corrugated plates, each of the corrugated plates having ridges and grooves;
   b) blasting a portion of the plates so as to create roughened surfaces, while leaving another portion of the plates unblasted;
   c) aligning the plates so as to be spaced apart from one another, with the ridges of any one plate aligned with the ridges of the other plates and orienting the plates so that the roughened surfaces are located at an upstream end and the unblasted portions of the plates are located at a downstream end;
   d) coupling the plates together.

13. The method of claim 12 wherein the step of aligning the plates further comprises the step of generally aligning the plates in a parallel arrangement.

14. The method of claim 12 wherein the step of aligning the plates further comprises the step of generally aligning the plates in a radial arrangement with the roughened surfaces nearer a center of the vane assembly than are the unblasted portions.

15. The method of claim 12 wherein:
   a) the step of blasting a portion of the plates further comprises the step of blasting a first group of plates and leaving a second group of plates unblasted;
   b) the step of orienting the plates further comprises the step of orienting the first group of plates in an end-to-end manner with the second group of plates.

16. A method of separating liquid from a gas stream, comprising the steps of:
   a) flowing the gas stream through a path and causing the gas stream to change direction so as to impact the liquid in the gas stream onto the sides of the path;
   b) flowing the liquid over a roughened surface on the sides of the path and reducing the surface tension of the liquid to cause coalescing of the liquid;
   c) increasing the surface tension of the liquid on the sides of the path so as to allow the liquid to drain off of the sides.

17. The method of claim 16 wherein
   the step of increasing the surface tension of the liquid on the sides of the path further comprises the step of flowing the liquid over a smooth surface.

18. A method of making a vane assembly for use in a liquid-gas separator, comprising the steps of:
   a) providing vanes;
   b) blasting at least a portion of the vanes so as to create roughened surfaces on the vanes;
   c) assembling the vanes together with the vanes being spaced apart and adjacent to one another so as to form a serpentine path between any two adjacent vanes.

19. An assembly for use in a separator for separating liquid from gas, comprising:
   a) vanes spaced apart from and adjacent to one another and forming a serpentine path between any two adjacent vanes;
   b) the vanes having an inlet section and an outlet section;
   c) the vanes having surfaces along the paths, at least a portion of the surface being roughened with a roughness profile of 2–6 mils anchor pattern.

* * * * *